US009772099B2

(12) United States Patent
Boomgaarden et al.

(10) Patent No.: US 9,772,099 B2
(45) Date of Patent: Sep. 26, 2017

(54) LOW-PROFILE LIGHTING DEVICE AND ATTACHMENT MEMBERS AND KIT COMPRISING SAME

(71) Applicant: Lighting Science Group Corporation, Melbourne, FL (US)

(72) Inventors: Mark Boomgaarden, Satellite Beach, FL (US); Richard LeClair, Indian Harbour Beach, FL (US); Yong Jiang, Satellite Beach, FL (US)

(73) Assignee: Lighting Science Group Corporation, Cocoa Beach, FL (US)

( * ) Notice: Subject to any disclaimer, the term of this patent is extended or adjusted under 35 U.S.C. 154(b) by 26 days.

(21) Appl. No.: 14/956,968

(22) Filed: Dec. 2, 2015

(65) Prior Publication Data

US 2016/0084491 A1 Mar. 24, 2016

Related U.S. Application Data

(63) Continuation-in-part of application No. 14/702,149, filed on May 1, 2015, which is a continuation of (Continued)

(51) Int. Cl.
*B60Q 1/00* (2006.01)
*F21V 29/70* (2015.01)
(Continued)

(52) U.S. Cl.
CPC .............. *F21V 29/70* (2015.01); *F21S 8/026* (2013.01); *F21V 21/041* (2013.01);
(Continued)

(58) Field of Classification Search
CPC ........ F21V 29/70; F21V 29/508; F21V 29/87; F21V 21/041; F21V 21/02; F21V 23/006;
(Continued)

(56) References Cited

U.S. PATENT DOCUMENTS 5,738,436 A 4/1998 Cummings et al.
6,161,910 A 12/2000 Reisenauer et al.
(Continued)

FOREIGN PATENT DOCUMENTS

| | | | |
|---|---|---|---|
| EP | 1950491 A1 | 7/2008 |
| JP | 2010-198807 | 9/2010 |
| WO | WO 2008137732 A1 | 11/2008 |

OTHER PUBLICATIONS

PCT International Searching Authority, International Search Report for related application PCT/US2015/063431 dated Mar. 10, 2015 (5 Pages).

(Continued)

*Primary Examiner* — Ali Alavi
(74) *Attorney, Agent, or Firm* — Mark Malek; Stephen Bullock; Widerman Malek, PL

(57) ABSTRACT

A luminaire comprising a housing formed of thermally conductive polymer with an optic carried thereby, a trim carried by the optic, and a light source. The light source may comprise an LED board comprising a copper layer and a plurality of light emitting diodes (LEDs) disposed on the LED board. The luminaire may also comprise control circuitry operably coupled to the plurality of LEDs, wherein the LED board is positioned in thermal communication with the housing. The luminaire may further comprise a mounting member configured to be attached to each of the housing and an external structure. The control circuitry may be configured to operate the plurality of LEDs such that heat generated by the plurality of LEDs is dissipated by the copper layer of the LED board.

19 Claims, 7 Drawing Sheets

Related U.S. Application Data application No. 14/492,348, filed on Sep. 22, 2014, which is a continuation of application No. 14/134,884, filed on Dec. 19, 2013, now Pat. No. 8,967,844, which is a continuation of application No. 13/476,388, filed on May 21, 2012, now Pat. No. 8,672,518, which is a continuation-in-part of application No. 12/775,310, filed on May 6, 2010, now Pat. No. 8,201,968.

(60) Provisional application No. 62/086,521, filed on Dec. 2, 2014, provisional application No. 61/248,665, filed on Oct. 5, 2009.

(51) Int. Cl.

| | |
|---|---|
| ***F21S 8/02*** | (2006.01) |
| ***F21V 21/04*** | (2006.01) |
| ***F21V 29/508*** | (2015.01) |
| ***F21V 29/87*** | (2015.01) |
| *F21V 23/00* | (2015.01) |
| *F21V 21/02* | (2006.01) |
| *F21V 23/02* | (2006.01) |
| *F21V 31/00* | (2006.01) |
| *F21Y 105/10* | (2016.01) |
| *F21Y 115/10* | (2016.01) |

(52) U.S. Cl.
CPC ............ *F21V 29/508* (2015.01); *F21V 29/87* (2015.01); *F21V 21/02* (2013.01); *F21V 23/006* (2013.01); *F21V 23/026* (2013.01); *F21V 31/005* (2013.01); *F21Y 2105/10* (2016.08); *F21Y 2115/10* (2016.08)

(58) Field of Classification Search
CPC .. F21V 23/026; F21V 31/005; F21Y 2105/10; F21Y 2115/10
See application file for complete search history.

(56) References Cited

U.S. PATENT DOCUMENTS

| | | | | |
|---|---|---|---|---|
| 6,168,299 | B1 | 1/2001 | Yan | |
| 6,431,728 | B1 | 8/2002 | Fredericks et al. | |
| 6,561,690 | B2 | 5/2003 | Balestriero et al. | |
| 6,616,291 | B1 | 9/2003 | Love | |
| 6,719,446 | B2 | 4/2004 | Cao | |
| 6,786,625 | B2 | 9/2004 | Wesson | |
| 6,799,864 | B2 | 10/2004 | Bohler et al. | |
| 7,102,172 | B2 | 9/2006 | Lynch et al. | |
| 7,125,146 | B2 | 10/2006 | Willis et al. | |
| 7,250,637 | B2 | 7/2007 | Shimizu et al. | |
| 7,360,925 | B2 | 4/2008 | Coushaine | |
| 7,413,321 | B2 | 8/2008 | Kim | |
| 7,540,761 | B2 | 6/2009 | Weber et al. | |
| 7,547,112 | B2 | 6/2009 | Kim | |
| 7,607,812 | B2 | 10/2009 | Kim | |
| 7,670,021 | B2 | 3/2010 | Chou | |
| 7,722,220 | B2 | 5/2010 | Van De Ven | |
| 7,722,227 | B2 | 5/2010 | Zhang et al. | |
| 7,810,960 | B1 | 10/2010 | Soderman et al. | |
| 7,828,465 | B2 | 11/2010 | Roberge et al. | |
| 7,892,022 | B2 | 2/2011 | Mostoller et al. | |
| 7,950,832 | B2 | 5/2011 | Tanaka et al. | |
| 7,959,332 | B2 | 6/2011 | Tickkner et al. | |
| 7,980,736 | B2 | 7/2011 | Soderman et al. | |
| 7,993,034 | B2 | 8/2011 | Wegner | |
| 8,096,671 | B1 | 1/2012 | Cronk et al. | |
| 8,201,968 | B2 | 6/2012 | Maxik et al. | |
| 8,348,477 | B2 | 1/2013 | Tickner et al. | |
| 8,545,047 | B2 | 10/2013 | Yip et al. | |
| 8,672,518 | B2 | 3/2014 | Boomgaarden et al. | |
| 8,967,844 | B2 | 3/2015 | Boomgaarden et al. | |
| 9,103,507 | B2 | 8/2015 | Allen et al. | |
| 2004/0090785 | A1 | 5/2004 | McInnis | |
| 2006/0126328 | A1 | 6/2006 | Coushaine | |
| 2008/0037255 | A1 | 2/2008 | Wang | |
| 2008/0165535 | A1 | 7/2008 | Mazzochette | |
| 2008/0170398 | A1 | 7/2008 | Kim | |
| 2008/0232093 | A1 | 9/2008 | Kim | |
| 2008/0232116 | A1 | 9/2008 | Kim | |
| 2008/0278957 | A1 | 11/2008 | Pickard et al. | |
| 2008/0285271 | A1 | 11/2008 | Roberge et al. | |
| 2009/0034261 | A1 | 2/2009 | Grove | |
| 2009/0086474 | A1 | 4/2009 | Chou | |
| 2009/0086504 | A1 | 4/2009 | Kim | |
| 2009/0129086 | A1 | 5/2009 | Thompson, III | |
| 2009/0141506 | A1 | 6/2009 | Lan et al. | |
| 2009/0284976 | A1 | 11/2009 | Storch et al. | |
| 2009/0298376 | A1 | 12/2009 | Guillien et al. | |
| 2010/0053950 | A1* | 3/2010 | Higuchi .................. | F21S 8/026 362/234 |
| 2010/0103678 | A1 | 4/2010 | Van De Ven et al. | |
| 2012/0262921 | A1* | 10/2012 | Boomgaarden ......... | F21S 8/026 362/249.02 |
| 2015/0092421 | A1 | 4/2015 | Boomgaarden et al. | |
| 2015/0300622 | A1 | 10/2015 | Boomgaarden et al. | |

OTHER PUBLICATIONS

PCT International Searching Authority, Written Opinion for related application PCT/US2015/063431 dated Mar. 10, 2016 (8 Pages).
Cree, Inc., Defendant, "Preliminary Invalidity Contentions", filed in the United States District Court for the Middle District of Florida Orlando Division, Case No. 6:13-cv-00587-RBD-GJK, on Dec. 20, 2013; 122 pages.
Cree, Inc., LR6 Six-Inch LED Downlight product literature, Rev. Dec. 19, 2012, 4 pages.
EP International Search Report for Application No. 10174449.8 dated Dec. 14, 2010.
European Office Action for Application No. 10 174 449.8. Mailed on Apr. 8, 2013. 4 pages.
European Office Action for Application No. 10174449.8; Dated Sep. 12, 2014.
Exhibit 44—Lighting Research Center, Lighting Research Program Project 2.3 Low-Profile LED Luminaries, PIER Final Project Report, prepared for the California Energy Commission, Apr. 2007, pp. 1-66, CEC-500-2005-141-A4.
Exhibit 46—Inteltech Corporation, Silescent 100i LV Light literature, Rev. May 2008, 4 pages.
Exhibit 48—Cree, Inc., LR6 Six-Inch LED Downlight product literature, Rev. Dec. 19, 2012, 4 pages.
Exhibit 51—Matsushita Electric Works, Ltd., MFORCE High-Output, High-Color Rendering LED Unit for Lighting product literature, Annual Report 2007.
Exhibit D—Cree, Inc., Defendant, "Preliminary Invalidity Contentions", filed in the United States District Court for the Middle District of Florida Orlando Division, Case No. 6:13-cv-00587-RBD-GJK, on Dec. 20, 2013; 500 pages.
Inteltech Corporation, Silescent 100i LV Light literature, Rev. May 2008, 4 pages.
Lighting Research Center, Lighting Research Program Project 2.3 Low-Profile LED Luminaries, PIER Final Project Report, prepared for the California Energy Commission, Apr. 2007, CEC-500-2005-141-A4, pp. 1-66.
Matsushita Electric Works, Ltd., MFORCE High-Output, High-Color Rendering LED Unit for Lighting product literature, Annual Report 2007, 2 pages.
Generation Brands, Inc., Defendant,. "Defendant's Preliminary invalidity Contentions for U.S. Pat. No. 8,201,958", filed in the United States District Court for the Middle District of Florida or Division, Case No. 6:16-cv-338-RBD-GJK, 67 pages.
Generation Brands, Inc., Defendant, "Defendant's Preliminary Invalidity Contentions. For U.S. Pat. No. 8,967,844", flied in the United States District Court for the Middle District of Florida Orlando Division, Case No. 6:16-cv-338-RBD-GJK, 74 pages.

(56) References Cited

OTHER PUBLICATIONS

American De Rosa Lamparts, LLC, Defendant, "Defendant and Counterclaim Plaintiff's Preliminary Invalidity Contentions", filed in the United States District Court for the Middle District of Florida Orlando Division, Case No. 6:16-cv-1087-ORL-41KRS, 233 pages.
Technical Consumer Products, Inc., Defendant, "Defendant Technical Consumer Products, Inc,'s Initial Invalidity Contentions", filed in the United States District Court for the Middle District of Florida Orlando Division, Case No. 6:16-cv-1255-Orl-375GJK, 414 pages.
Nicor, Inc., Defendant, "Defendant Nicor, Inc.'s Preliminary Non-Infringement and Invalidity Disclosures", filed in the United States District Court for the Middle District of Florida Orlando Division, Case No. 616-cv-413-ORL-37GJK, 60 pages.
Amax Lighting, Inc., Defendant, "AMAX Lighting's Non-Infringement Contentions and Invalidity Contentions", filed in the United States District Court for the Middle District of Florida Orlando Division, Case No. 6:16-01321-Orl-37GJK, 470 pages.

* cited by examiner

LOW-PROFILE LIGHTING DEVICE AND ATTACHMENT MEMBERS AND KIT COMPRISING SAME

RELATED APPLICATIONS

This application is a continuation-in-part of and claims the benefit under 35 U.S.C. §120 of U.S. patent application Ser. No. 14/702,149 titled Low Profile Light and Accessory Kit for the Same filed May 1, 2015, which in turn is a continuation of U.S. patent application Ser. No. 14/492,348 titled Low Profile Light and Accessory Kit for the Same filed Sep. 22, 2014, which in turn is a continuation of U.S. patent application Ser. No. 14/134,884, now U.S. Pat. No. 8,967,844 titled Low Profile Light and Accessory Kit for the Same filed Dec. 19, 2013, which in turn is a continuation of U.S. patent application Ser. No. 13/476,388, now U.S. Pat. No. 8,672,518, titled Low Profile Light and Accessory Kit for the Same filed May 21, 2012, which in turn is a continuation-in-part of U.S. patent application Ser. No. 12/775,310, now U.S. Pat. No. 8,201,968, titled Low Profile Light filed May 6, 2010, which in turn claims priority to U.S. Provisional Patent Application Ser. No. 61/248,665 titled Low Profile Light filed Oct. 5, 2009, the contents of each of which are incorporated by reference herein, except to the extent disclosures therein are inconsistent with disclosures herein. Furthermore, this application claims the benefit under 35 U.S.C. §119(e) of U.S. Provisional Patent Application No. 62/086,521 titled Low-Profile Lighting Device and Attachment Members and Kit Comprising Same filed Dec. 2, 2014, the content of which is incorporated by reference herein, except to the extent disclosure therein is inconsistent with disclosure herein.

FIELD OF THE INVENTION

The present invention relates to systems for a low-profile lighting device and kits comprising the same.

BACKGROUND OF THE INVENTION

Digital lighting technologies such as light-emitting diodes (LEDs) offer significant advantages over incandescent and fluorescent lamps. These advantages include, but are not limited to, better lighting quality, longer operating life, and lower energy consumption. LEDs also are being designed to have more desirable color temperatures than traditional lamps.

A number of design challenges and costs are associated with replacing traditional lamps with LED illumination devices. These design challenges include thermal management, installation ease, and manufacturing cost control.

Thermal management describes a system's ability to draw heat away from an LED. Lighting technology that employs LEDs suffers shortened lamp and fixture life and decreased performance when operating in high-heat environments. Moreover, when operating in a space-limited enclosure, such as a can light fixture, for example, the heat generated by an LED and its attending circuitry itself can cause damage to the LED. Passive cooling technology, such as a heat sink thermally coupled to a digital device, may be used to transfer heat from a solid material to a fluid medium such as, for example, air. One of the challenges in using a heat sink, however, is that of absorbing and dissipating heat at a sufficient rate with respect to the amount of heat being generated by the LED. If the heat sink does not have the optimal amount of capacity, the heat can gradually build up behind the LED and cause damage to the components.

Compared to incandescent and fluorescent lamps, LED-based lighting solutions have relatively high manufacturing and component costs. These costs are often compounded by a need to replace or reconfigure a light fixture that is designed to support incandescent or fluorescent lamps to instead support LEDs. Consequently, the cost of adoption of digital lighting technology, particularly in the consumer household market, is driven by design choices for retrofit LED-based lamps that impact both cost of manufacture and ease of installation.

Much of the heat generated by LEDs comes out the back of the lamp itself. Consequently, many lamp designs feature heat sinks with fins extending toward the back of a lamp. However, these designs suffer from unfavorable heat dissipation characteristics when used in a space-limited environment such as a can light fixture.

Accordingly, there is a need in the art for an LED-based lighting system that is not cost prohibitive to manufacture that effectively manages heat without a heat sink.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

In view of the foregoing, it is therefore an object of the present invention to provide an improved LED-based lamp for use in a space limited lamp enclosure, such as a can light fixture. The embodiments of the present invention are related to a heat efficient low-profile lighting device, attachment members and kit.

The present invention is a luminaire comprising a housing formed of thermally conductive polymer with an optic carried thereby, a trim carried by the optic and a light source. The light source may comprise an LED board comprising a copper layer and a plurality of light emitting diodes (LEDs) disposed on the LED board. The device may also comprise control circuitry operably coupled to the plurality of LEDs, wherein the LED board is positioned in thermal communication with the housing. The device may further comprise a mounting member configured to be attached to each of the housing and an external structure. The control circuitry may be configured to operate the plurality of LEDs such that heat generated by the plurality of LEDs is dissipated by the copper layer of the LED board.

The luminaire may further comprise a power circuit positioned in electrical communication with the light source and configured to receive electrical power from a power source. The luminaire may condition the electrical power for use by the light source and deliver the conditioned electrical power to the light source.

In some embodiments, the luminaire further includes a housing composed of polycarbonate 5VA flame rated material. Furthermore, the control circuitry may be configured to reduce the thermal energy produced by the plurality of LEDs by reducing the duty cycle of one or more of the LEDs. Additionally, the control circuitry may comprise electronic components necessary for controlling the operation of the light source, comprising a microcontroller, a memory, and connections configured to enable the operation of individual LEDs or subsets of LEDs.

The luminaire may further comprise a plurality of pillars configured to attach the power circuit to the light source circuit board and space the power circuit apart from the light source. The plurality of pillars may be formed of a material having a low rate of thermal conductivity and may be attached to the power circuit and configured so as to be carried by the light source.

The lighting device may also contain an optic positioned in communication with the light source and configured to alter light passing through the light source by diffusing light passing therethrough and structuring the emitted light to appear uniform in brightness, color, color temperature, and CRI.

In some embodiments, the luminaire may comprise a gasket positioned between the optic and the housing. Furthermore, the trim may be configured to be carried by the housing so as to overlie the optic perimeter.

The mounting member may comprise a plate mounting member comprising a base member with a medially located aperture. The plate mounting member may be configured to be attached to the external structure and may be configured to attach to the luminaire by the positioning of at least part of the luminaire within the medially located aperture. The mounting member may also include hook mounting members attachable to the luminaire housing and configured to engage the external structure. Furthermore, the mounting member may be comprised of spring mounting members that include rotatable arms. The spring mounting members may be attachable to the luminaire housing and configured so as to engage the external structure.

Additionally, the base member may comprise one or more attachment features configured to facilitate the attachment of the plate mounting member to the external structure. The base member may also comprise one or more projection members positioned adjacent to the medially located aperture so as to attach to a structure of the luminaire that extends through the medially located aperture.

In some embodiments, the housing may comprise a distal cavity comprising one or more projections. The projection members may comprise one or more bends configured to conform, interface, and interlock with the projections of the distal cavity.

DETAILED DESCRIPTION OF THE INVENTION

Figure 1:
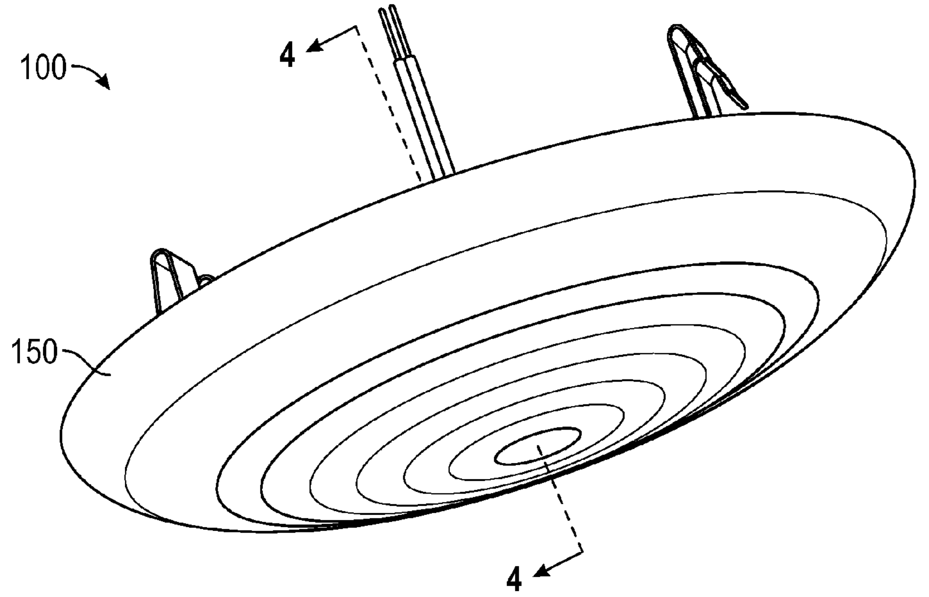
FIG. 1 is a lower perspective view of a luminaire according to an embodiment of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention text, as shown and described by the various figures and accompanying text, provides a low profile downlight, more generally referred to as a luminaire. The luminaire may comprise an LED light source comprising an LED board. The LED board may comprise at least one layer of copper that may be configured to dissipate thermal energy generated by the LED light source. Some embodiments of the luminaire may advantageously omit a discrete heat spreading structure, such as a heat sink. Furthermore, the LED light source may be configured to operate so as to produce light of acceptable characteristics, such as brightness, color, color temperature, and color rendering index (CRI) while maintaining a thermal equilibrium of components of the luminaire within a temperature range that will have either little or no negative effects on the operation and/or the operational longevity of the luminaire. Furthermore, the luminaire may be configured to cooperate with various attachment mechanisms to facilitate the attachment of the luminaire to typical light fixture hardware.

Referring now to FIGS. 1-4, a luminaire 100 according to an embodiment of the present invention will now be discussed. The luminaire 100 may comprise a housing 110, a power circuit 120, a light source 130, an optic 140, and a trim 150. The housing 110 may be configured to carry, either directly or indirectly, the other elements comprised by the luminaire 100. In some embodiments, the housing 110 may be configured to facilitate the attachment of any of the control circuitry 136, the light source 130, the optic 140, and the trim 150 thereto.

In the present embodiment, the housing 110 may comprise a base plate 111, a first raised section 112, a second raised section 113, an interior section 114, and an aperture 115 defined by the interior section 114. The various elements of the housing 110 may be configured to facilitate the accommodation and/or attachment of other components of the luminaire 100. For example, the housing 110 may comprise a plurality of fastening apertures 116 configured to permit fastening devices to pass therethrough so as to fasten other components of the luminaire 100 to the housing 110. More specifically, the housing 110 may comprise a first plurality of apertures 116' to facilitate the attachment of the trim 150 thereto. Furthermore, the housing 110 may comprise a second plurality of apertures 116" to facilitate the attachment of a mounting member thereto. Additional details regarding the various embodiments of the mounting member will be provided hereinbelow. In the present embodiment, the fasteners may be screws. Any type of fastener as is known in the art is contemplated and included within the scope of the invention. Additionally, in the present embodiment, the housing 110 may comprise a plurality of clasps 117 configured to receive a section of the light source 130, thereby carrying the light source 130 and preventing or inhibiting motion of the light source 130 relative to the housing 110. Furthermore, alternative means and methods of attaching the other components of the luminaire 100 to the housing 110 are contemplated and included within the scope of the invention, including, but not limited to, use of adhesives and glues, welding, interference fits, magnetic coupling, and the like.

Furthermore, the second raised section 113 may be configured to receive a gasket member to facilitate the creation of a water-resistant chamber. More specifically, the second raised section 113 may comprise a recess 118 configured to receive a gasket member 170 further comprised by the luminaire 100. The gasket member 170 may be positioned so as to conform to the geometry of the second raised section 113, fitting within the recess 118 and thereby inhibiting motion of the gasket member 170 relative to the housing 110. Furthermore, the gasket member 170 may be configured to be compressed, thereby forming a seal between itself, the second raised section 113, and the member which is adapted to compress the gasket member 170. In some embodiments, the gasket member 170, the housing 110, and the optic 140 may cooperate to establish a water resistant chamber. In such embodiments, the optic 140 may be configured so as to be positionable to compress the gasket member 170 against the second section 113.

Additionally, the housing 110 may further comprise a distal cavity 119. The distal cavity 119 may be configured to extend from the base plate 111 in a direction generally opposite the direction the first and second raised sections 112, 113 extend from the base plate 111. Furthermore, the distal cavity 119 may be dimensioned so as to permit the power circuit 120 to be positioned therewithin. Additionally, the distal cavity 119 may be configured to have one or more projections 119' extending radially outward from the distal cavity 119 to facilitate the attachment of a mounting member, as will be described in greater detail hereinbelow.

Additional details regarding the power circuit 120 and the light source 130 will now be provided. The power circuit 120 may be positioned in electrical communication with the light source 130. Furthermore, the power circuit 120 may be configured to receive electrical power from a power source, condition the electrical power for use by the light source 130, and deliver the conditioned electrical power to the light source 130. Conditioning may include AC-DC conversion, DC-DC voltage adjustment, and the like.

In some embodiments, the light source 130 may comprise one or more light-emitting devices 131. The light-emitting devices 131 may be any type of light-emitting devices as is known in the art, including, but not limited to, incandescent devices, halogen devices, fluorescent devices, high-intensity discharge devices, and light-emitting semiconductor devices, such as light-emitting diodes (LEDs). In the present embodiment, the light source 130 comprises a plurality of LEDs 131.

The LEDs 131 may be configured to be operated to produce light of predetermined characteristics, such as brightness, color, color temperature, CRI, or to have a selected spectral power distribution. Moreover, the plurality of LEDs 131 may comprise LEDs configured to emit light having differing characteristics from another LED of the plurality of LEDs 131.

Furthermore, the light source 130 may comprise control circuitry 136. The control circuitry 136 may be operably coupled to the plurality of LEDs 131 so as to control the operation of each LED of the plurality of LEDs 131, or subsets of the plurality of LEDs 131, so as to vary the characteristics of light emitted thereby, resulting in the variance of characteristics of light emitted by the luminaire 100. Furthermore, the light source 130 may comprise a circuit board 132. Each of the plurality of LEDs 131 and the control circuitry 136 may be carried by the circuit board 132, and positioned in electrical and thermal communication therewith. The circuit board 132 may be configured to enable the individual operation of each LED of the plurality of LEDs 131 by the control circuitry 136, or subsets thereof.

Furthermore, the circuit board 132 may be configured to facilitate the attachment of the light source 130 to the housing 110. More specifically, the circuit board 132 may comprise one or more cut-outs 133 along a periphery of the circuit board 132 and one or more attaching sections 134 intermediate the cut-outs 133 along the periphery of the circuit board 132. The cut-outs 133 may be configured to have sufficient dimensions and positioned along the periphery of the circuit board 132 to accommodate the positioning of the clasps 117 of the housing 110 therein. Furthermore, the attachment sections 134 may be configured to couple to the clasps 117 so as to removably attach the circuit board 132 to the clasps 117, thereby enabling the light source 130 to be carried by the housing 110.

The control circuitry 136 may be configured to control the operation of the plurality of LEDs 131 so as to achieve a thermal equilibrium as described hereinabove. In some embodiments, the control circuitry 136 may be configured to reduce the thermal energy produced by the plurality of LEDs 131 by any means or method known in the art, including reducing the duty cycle of one or more of the LEDs of the plurality of LEDs 131, or by underdriving one or more of the LEDs of the plurality of LEDs 131, e.g. providing less current to an LED than the LED is rated to conduct. Such operation may also enable the control circuitry 136 to reduce the intensity of light emitted by the luminaire 100 responsive to an input indicating the instruction of accomplishing the same.

In some embodiments, the control circuitry 136 may comprise electronic components necessary for controlling the operation of the light source 130, including, but not limited to, a microcontroller, a memory, including volatile and/or non-volatile memory, connections to the light source 130 enabling operation of each individual LED of the plurality of LEDs 131, or subsets thereof, and connections for receiving electrical power from the power circuit 120.

In some embodiments, the power circuit 120 may be carried by the light source 130. In the present embodiment, the luminaire 100 may further comprise a plurality of pillars 160. The plurality of pillars 160 may be configured to attach the power circuit 120 to the light source 130, specifically to the circuit board 132 of the light source 130. In such embodiments, the circuit board 132 may comprise a plurality of pillar apertures 135 configured to receive and permit positioning therewithin of an end of the plurality of pillars 160. Furthermore, the end of the plurality of pillars 160 that are configured to attached to the circuit board 132 may be configured to, when passed through the pillar apertures 135, deflect inward and subsequently outward so as to attach to the circuit board 132. Similarly, the power circuit 120 may comprise a power circuit board 122 comprising a plurality of pillar apertures 124 configured similarly to the plurality of pillar apertures 135 of the circuit board 132, being configured to receive and permit positioning therewithin of another end of the plurality of pillars 160. That end of the plurality of pillars 160 may similarly be configured to, when passed through the pillar apertures 124, deflect inward and subsequently outward so as to attach to the power circuit board 122. Accordingly, when the plurality of pillars 160 are attached to each of the circuit board 132 and the power circuit board 122, the power circuit 132 may be carried by the light source 130. In some embodiments, the plurality of pillars 160 may be positioned so as to space the power circuit 120 apart from the light source 130. Furthermore, the plurality of pillars 160 may be formed of a material having a low rate of thermal conductivity, thereby inhibiting the flow of heat from the power circuit 120 to the light source 130.

The optic 140 may be an optical device configured to be positioned in optical communication with the light source 130. In some embodiments, the optic 140 may be configured to alter light passing therethrough, so as to alter light emitted by the luminaire 100. In some embodiments, the optic 140 may be configured to alter the distribution of light passing therethrough, including, but not limited to, diffusing, collimating, reflecting, refracting, or focusing light. In the present embodiment, the optic 140 may be configured to diffuse light passing therethrough such that an observer of light emitted by the luminaire 100 may not be able to distinguish light as being emitted from a plurality of light-emitting devices, instead having the appearance having a generally uniform distributions in terms of at least one of brightness, color, color temperature, and CRI.

Furthermore, the optic 140 may be configured to cooperate with the housing 110 and the gasket member 170 so as to define a water-resistant chamber. More specifically, the optic 140 may be configured so as to be positionable adjacent to the second raised section 113 of the housing 110 so as to compress the gasket member 170 therebetween, establishing a water-resistant seal. Accordingly, the optic 140 may be configured to have a shape conforming to the shape of the second raised section 113. In the present embodiment, each of the optic 140 and the second raised section 113 may be generally circular. Accordingly, the gasket member 170 may be similarly circular, commonly referred to as an o-ring.

The trim 150 may be configured to be attached to and carried by the housing 110. Furthermore, the trim 150 may be configured to be carried by the housing 110 so as to overlie a perimeter of the optic 140. Additionally, the positioning of the trim 150 may shield the attachment of the optic 140 to the housing 110, as well as the seal formed between the optic 140, the gasket member 170, and the second raised section 113, from environmental factors. In some embodiments, the trim 150 may comprise a plurality of fastener receiving sections 152 configured to engage with a fastener passing through an aperture 116' of the housing 110, thereby attaching the trim 150 to the housing 110.

In the present embodiment, each of the housing 110, the optic 140, and the trim 150 may be fabricated from a variety of materials. Advantageously, each of the housing 110, the optic 140, and the trim 150 may be fabricated from a material having relatively poor thermal conductivity characteristics, such as metals, metal alloys, thermally conductive polymers, thermally conductive ceramics, and the like. In the present embodiment, each of the housing 110, the optic 140, and the trim 150 may be fabricated from a polymer, such as polycarbonate. More specifically, each may be fabricated of 5VA flame rated polycarbonate.

In some embodiments of the invention, one or more mounting members may be included with the luminaire 100. In some embodiments, a single mounting member may be comprised by a luminaire 100. In some embodiments, the invention may be a kit comprising a luminaire 100 and one or more mounting members of varying types. Various embodiments of mounting members included with the invention will now be discussed.

A first type of mounting member is a plate mounting member 200. The plate mounting member 200 may be configured to be attached to a structure of the luminaire 100 as well as to an external structure to facilitate the attachment of the luminaire 100 to the external structure. The plate mounting member 200 may comprise a base member 210 and a plurality of projection members 220 extending from the base member 210. The base member 210 may comprise an aperture 212. The aperture 212 may be configured to permit a structure of the luminaire 100 to be positioned at least partially therein and pass therethrough. In the present embodiment, the aperture 212 may be configured to permit the distal cavity 119 to pass therethrough.

Figure 7:
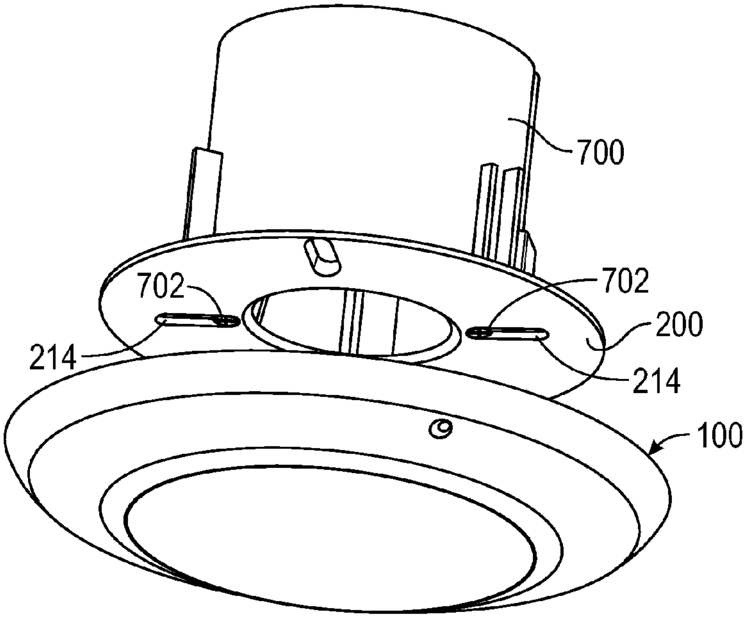
FIG. 7 is a photograph showing a perspective view of a luminaire according to an embodiment of the invention positioned for attachment to a light fixture canister after the attachment of a mounting plate to the light fixture canister.
Figure 8:
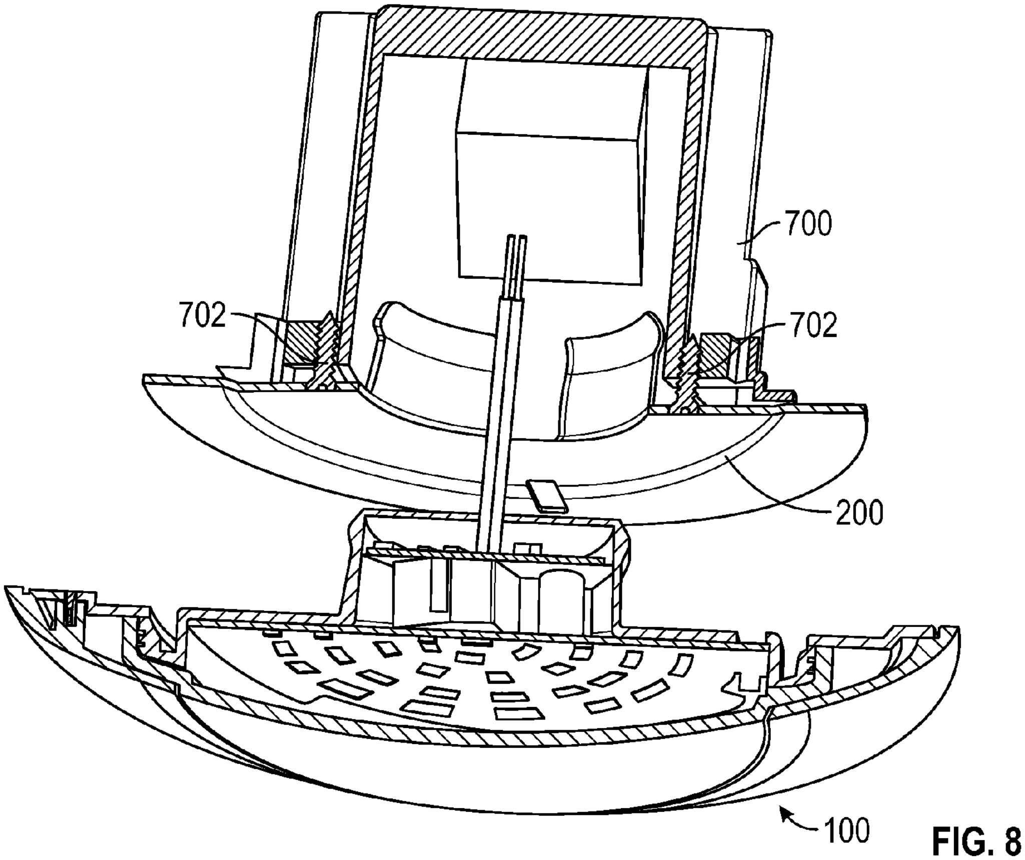
FIG. 8 is a photograph showing a perspective cross sectional view of the luminaire, mounting plate, and light fixture canister of FIG. 7.

Additionally, the base member 210 may comprise one or more attachment features 214 configured to facilitate attachment of the plate mounting member 200 to an external structure. In the present embodiment, the attachment features 214 comprise a plurality of openings. The openings may be configured to permit a fastener, such as a screw, to pass therethrough so as to engage with a corresponding fastener receiving feature of the external structure. Referring now additionally to FIGS. 7-8, a plate mounting member 200 is shown attached to an external structure 700, in this embodiment, a canister light fixture, by a plurality of fasteners 702 positioned through the attachment features 214. The use of fasteners to attach the plate mounting member 200 to an external structure is exemplary only, and all other means or methods of attachment as are known in the art are contemplated and included within the scope of the invention.

Figure 9:
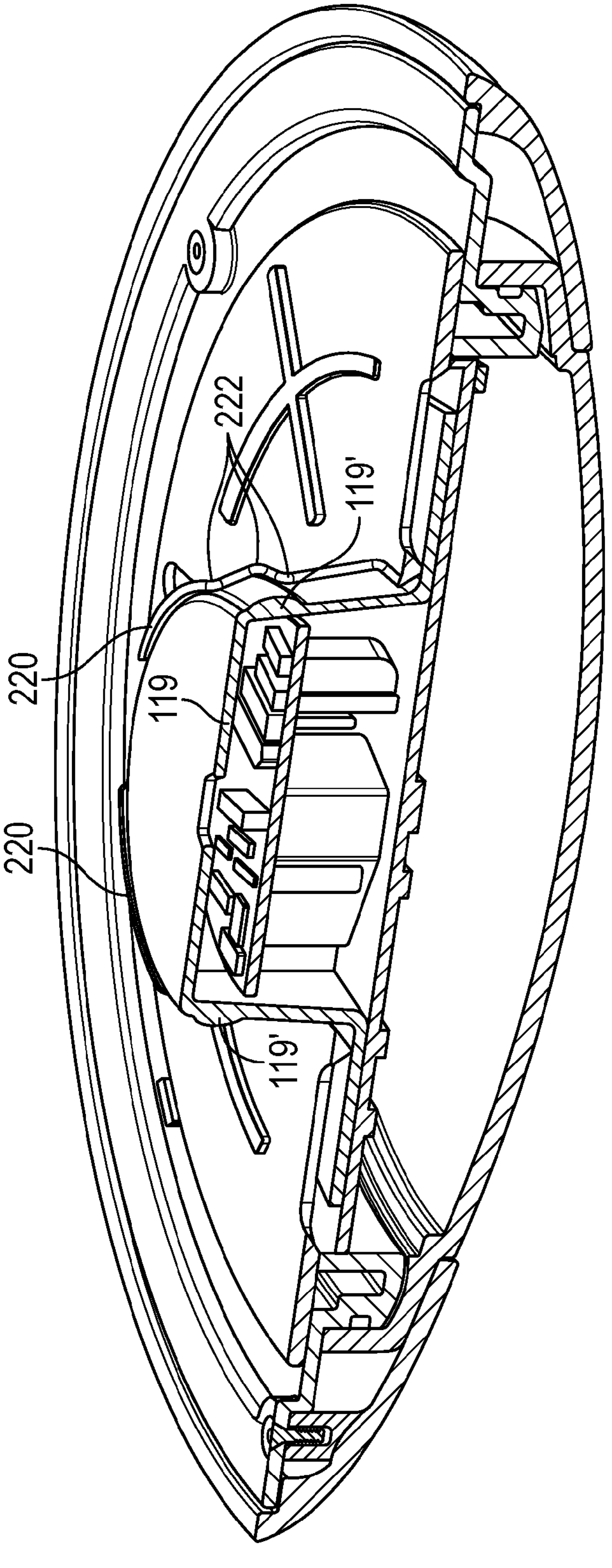
FIG. 9 is a perspective cross sectional view of the luminaire as attached to the mounting plate.

The projection members 220 may be configured to cooperate with a structure of the luminaire 100 to attach to and carry the luminaire 100. Additionally, the projection members 220 may be positioned adjacent to the aperture 212 so as to attach to a structure of the luminaire 100 that extends through the aperture 212. In the present embodiment, the projection members 220 may be configured to attach to an outer surface of the distal cavity 119. More specifically, the projection members 220 may comprise one or more bends 222 configured to cause the shape of the projections members 220 to conform to the shape of the projections 119' of the distal cavity 119, as illustrated additionally in FIG. 9. When the distal cavity 119 is positioned to extend through the aperture 212, the projection members 220 may interface with the distal cavity 119 such that the bends 222 cause the projection member to catch on the projections 119' of the distal cavity 119, causing the projection members 220 to carry the luminaire 100.

Figure 2:
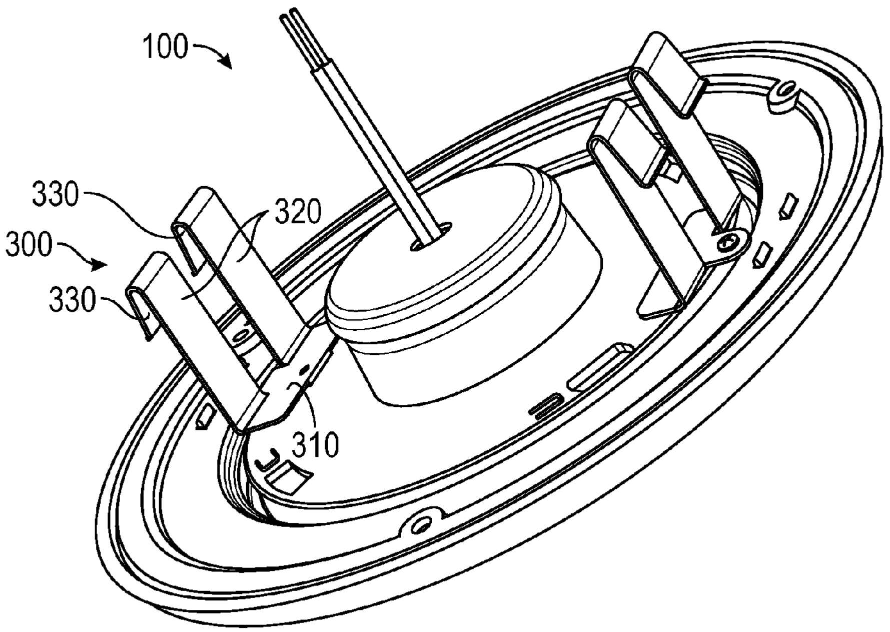
FIG. 2 is an upper perspective view of the luminaire of FIG. 1.
Figure 3:
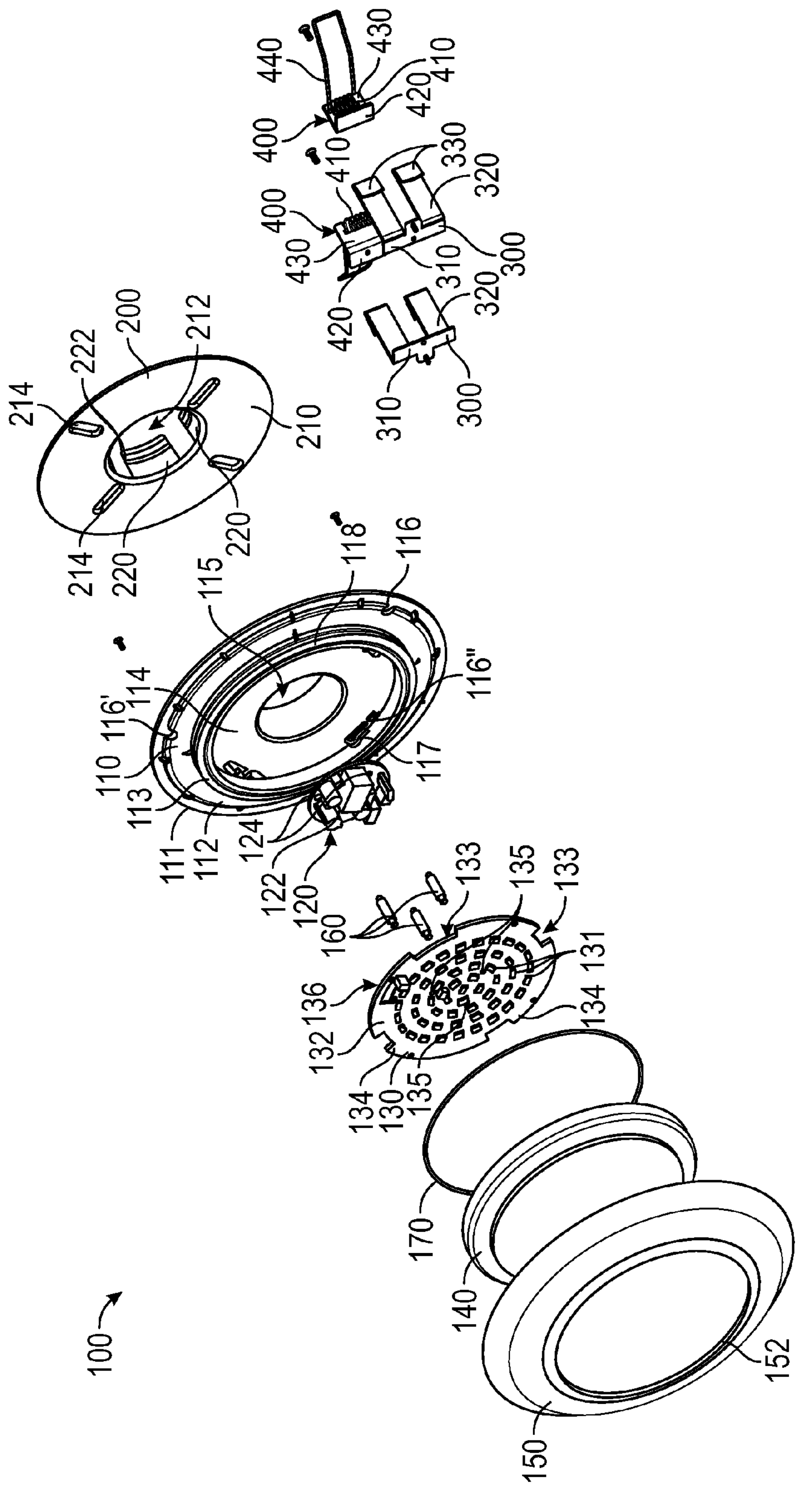
FIG. 3 is an exploded perspective exploded view of the luminaire of FIG. 1.
Figure 4:
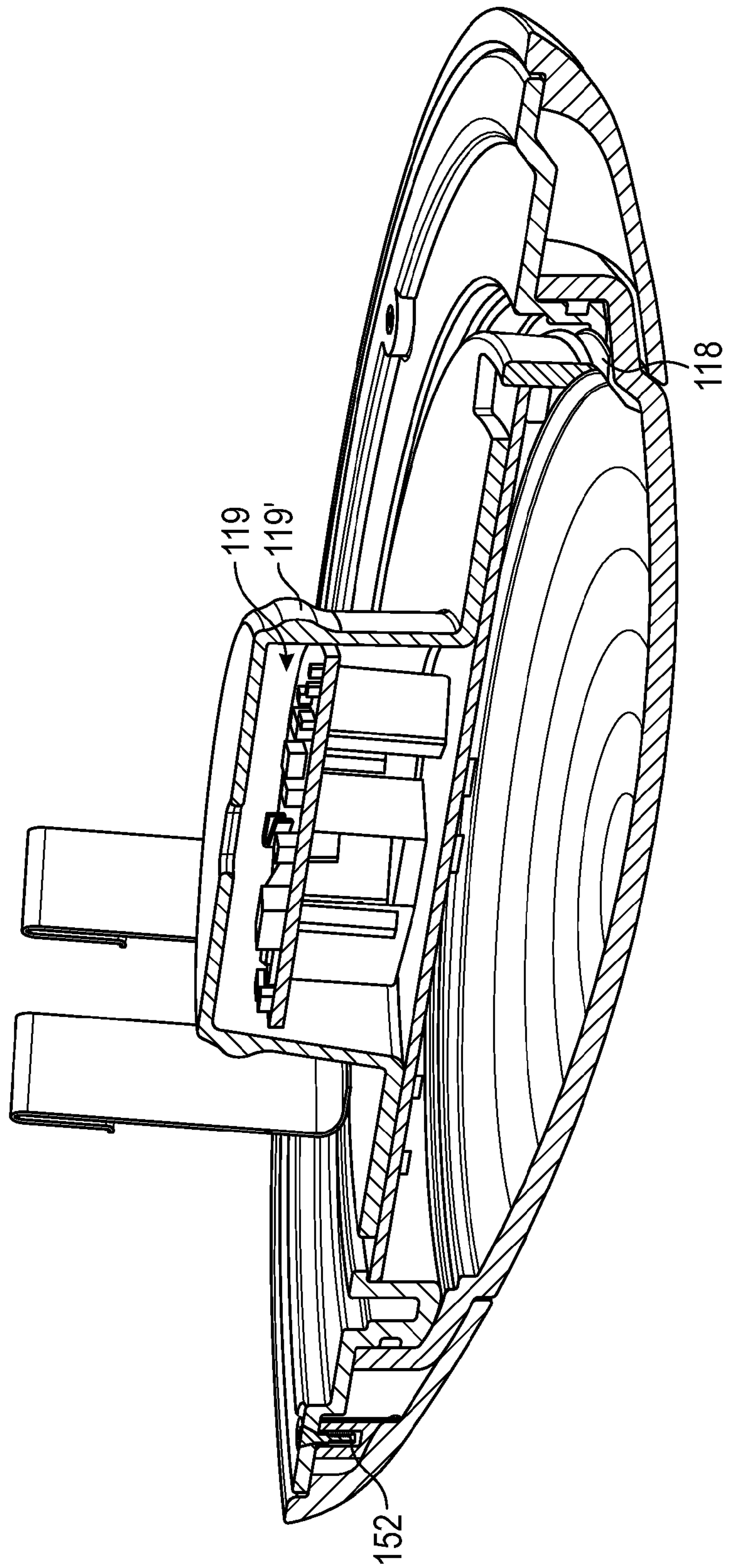
FIG. 4 is a cross sectional perspective sectional view of the luminaire of FIG. 1 and taken through line 4-4.

Referring now back to FIGS. 1-3, an additional embodiment of mounting members according to the invention will now be discussed. Hook mounting members 300 may be configured to be attached to a structure of the luminaire 100 and removably couple to an external structure by hooking onto the external structure. The hook mount members 300 may comprise an attachment section 310, an extension section 320, and a hooked section 330. The attachment section 310 may be configured to attach the hook mounting member 300 to the luminaire 100 by attaching to a structure of the luminaire 100. In the present embodiment, the attachment section 310 may be configured to attach to the housing 110 of the luminaire 100. Furthermore, the attachment section 310 to be attached to the housing 110 by the use of fasteners positioned through a hole of the attachment section 310 and engaging with the second plurality of apertures 116", thereby attaching the attachment section 310. Any other means or method of attaching the attachment section 310 to the housing 110 as are known in the art are contemplated and included within the scope of the invention.

The extension section 320 may be configured to extend away from the attachment section 310. The extension section 320 may be configured to be attached to the attachment section 310 at a first end and to the sloped section 330 at a second end. In some embodiments, each of or any combination of the attachment section 310, the extension section 220, and the hooked section 330 may be integrally formed as a single structure. The hooked section 330 may be configured to engage with an external hooked section 330 and the extension section 320.

Figure 5:
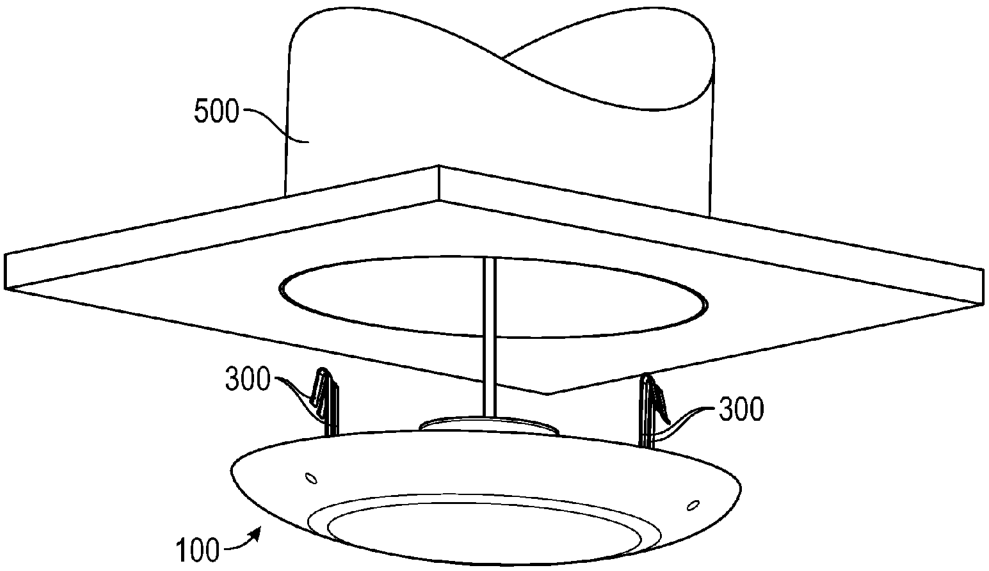
FIG. 5 is a photograph showing a perspective view of a luminaire according to an embodiment of the invention positioned for attachment to a light fixture canister.
Figure 6:
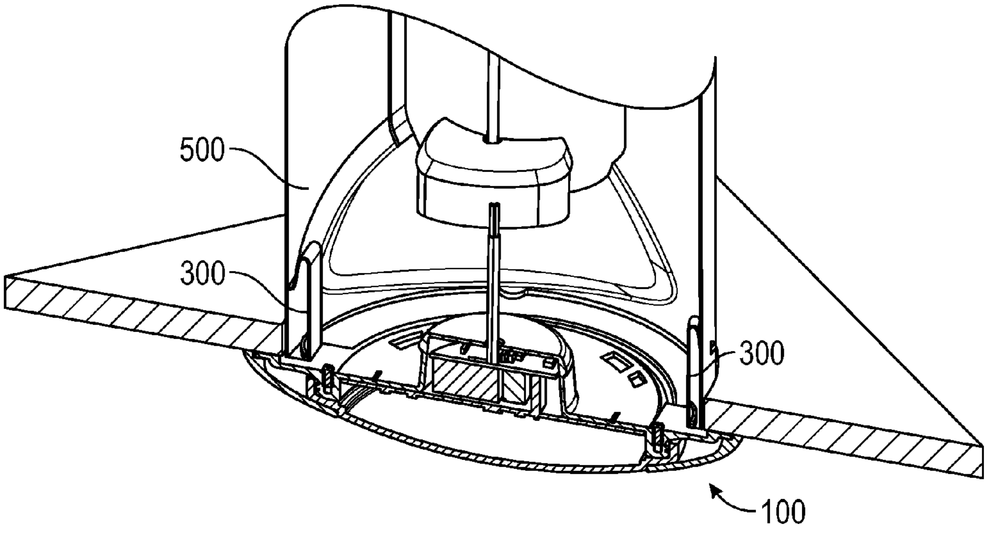
FIG. 6 is a photograph showing a perspective cross sectional view of the luminaire of FIG. 5 after attachment to the light fixture canister.

Referring now to FIGS. 5-6, in embodiments of the luminaire 100 having hook mounting members 300 attached thereto is presented. In FIG. 5, the luminaire 100 is shown positioned immediately beneath an external structure 500, in the present embodiment, a canister light fixture. In FIG. 6, the luminaire 100 is shown having been positioned such that the hook mounting members 300 and engaged with the external structure 500, more specifically, the structural feature thereof such that the hook mounting members 300 and engaged with the structural feature so as to carry the luminaire 100 through the engagement. Accordingly, the external structure 500 may carry the luminaire 100 as a result of the hook mounting member 300 hooking onto the external structure 500.

Referring now back to FIGS. 1-3, an additional embodiment of mounting members according to the invention will now be discussed. Similar to the hook mounting members 300, spring mounting members 400 may be configured to be attached to a structure of the luminaire 100 and removably couple to an s by the exertion of force by a spring member 410 of the spring mounting member 400. In addition to the spring member 410, the spring mounting member 400 may comprise an attachment section 420, a spring mounting section 430, and a rotatable arm 440. The attachment section 420 may be configured to attach to the housing 110 of the luminaire 100 by the same method as the attachment of the hook mounting members 300. The spring mounting section 430 may extend away from the attachment section 420 may configured to facilitate the attachment of the spring member 410 thereto. Furthermore, the spring mounting section 430 may be configured to exert an opposing force to the spring member 410 so as to permit the rotation of the rotatable arm 440. The spring member 410 may be attached to and carried by the spring mounting section 430, and may additionally be attached to the rotatable arm 440 such that the rotatable arm 440 may be rotated with respect to the spring mounting section 430, with a resistive force being exerted upon the rotatable arm 440 by the spring member 410.

Figure 10:
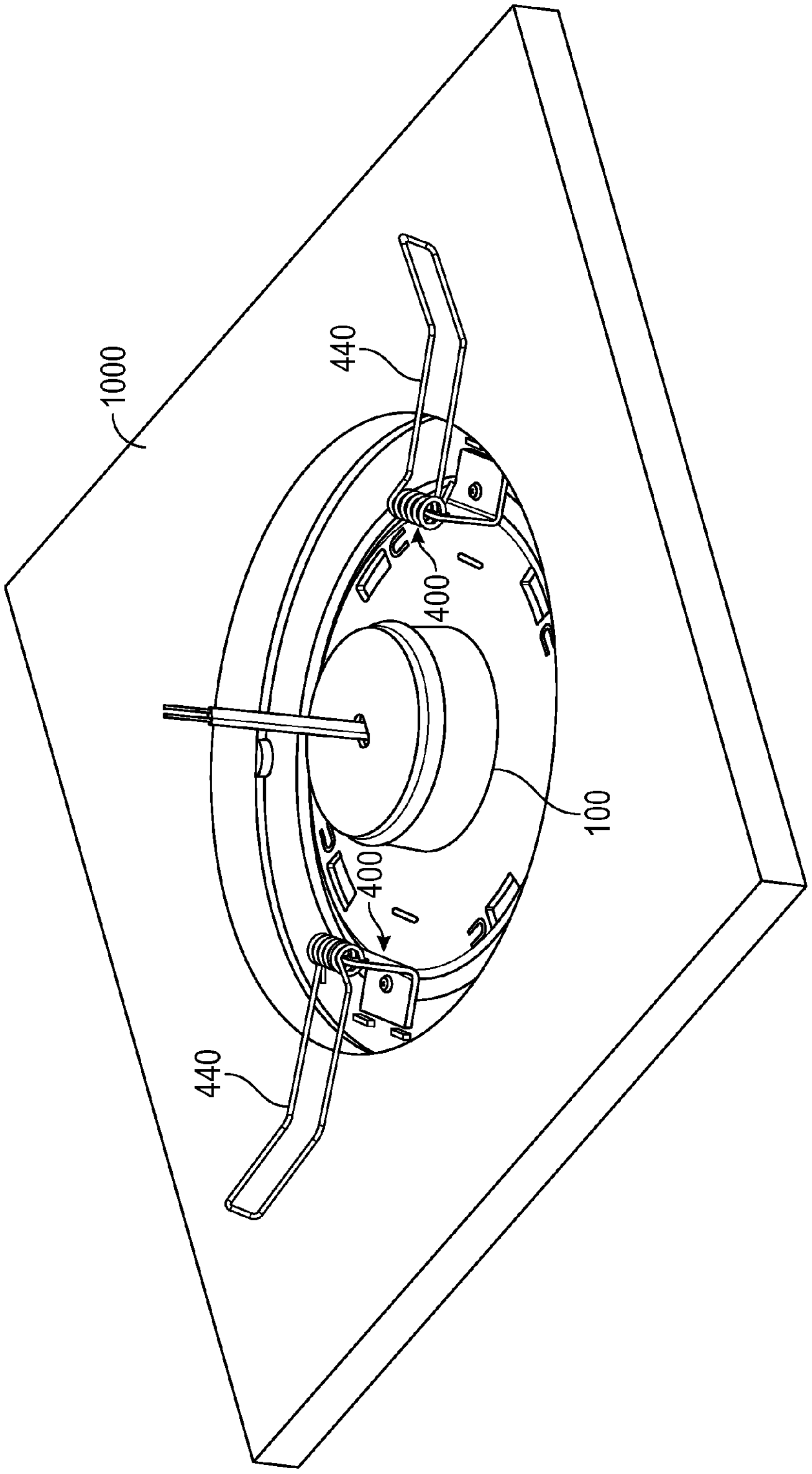
FIG. 10 is a rear perspective view of a luminaire according to an embodiment of the invention after attachment to a ceiling structure.

Referring now additionally to FIG. 10, an embodiment of a luminaire 100 including two spring mounting members 400 is presented. In the depiction, the rotatable arms 440 are shown engaging with an external structure 1000. The external structure 1000 may be any generally flat structure of sufficient structural strength and stability to carry the luminaire 400. In some embodiments, the external structure 1000 may be a ceiling, ceiling tile, or the like. The spring member 110 of each spring mounting member 400 may exert a force upon the rotatable arm 440 so as to cause an interactive force between the rotatable arm 440 and the external structure 1000 such that the external structure 1000 may carry the luminaire 100 thereby. Any number of spring mounting members 400 is contemplated included within the scope of the invention.

As referenced above, an embodiment of the invention may be a kit comprising a luminaire 100 as described hereinabove further comprising at least one mounting member. The kit may comprise any individual mounting member combinations thereof, or all of a plate mounting member 200, hook mounting members 300, and/or spring mounting members 400.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

That which is claimed is:

1. A luminaire comprising:

a housing formed of thermally conductive polymer;

an optic carried by the housing;

a trim carried by the optic;

a light source comprising:

an LED board comprising a copper layer, a plurality of light-emitting diodes (LEDs) disposed on the LED board, and control circuitry operably coupled to the plurality of LEDs, wherein the LED board is positioned in thermal communication with the housing; and a mounting member configured to be attached to each of the housing and an external structure;

wherein the control circuitry is configured to operate the plurality of LEDs such that heat generated by the plurality of LEDs is dissipated by the copper layer of the LED board;

wherein the control circuitry comprises electronic components necessary for controlling the operation of the light source comprising a microcontroller, a memory, and connections configured to enable the operation of individual LEDs or subsets of LEDs.

2. The luminaire according to claim 1 further comprising a power circuit is positioned in electrical communication with the light source and configured to receive electrical power from a power source, condition the electrical power for use by the light source, and deliver the conditioned electrical power to the light source.

3. The luminaire according to claim 1 wherein the housing is composed of polycarbonate 5VA flame rated material.

4. The luminaire according to claim 1 wherein the control circuitry is configured to reduce the thermal energy produced by the plurality of LEDs by reducing the duty cycle of one or more of the LEDs.

5. The luminaire according to claim 1 wherein the control circuitry is configured to reduce the thermal energy produced by the plurality of LEDs by underdriving one or more of the LEDs.

6. The luminaire according to claim 1 wherein the mounting member comprises spring mounting members comprising rotatable arms; and wherein the spring mounting members are attachable to the luminaire housing and configured so as to engage the external structure.

7. The luminaire according to claim 1 further comprising a plurality of pillars configured to attach the power circuit to the light source circuit board and to space the power circuit apart from the light source.

8. The luminaire according to claim 7 wherein the plurality of pillars are formed of a material having a low rate of thermal conductivity; wherein the plurality of pillars are attached to the power circuit and configured so as to be carried by the light source.

9. The luminaire according to claim 1 wherein the optic is positioned to be in communication with the light source and configured to alter light passing through the light source by diffusing light passing therethrough and structuring the emitted light to appear uniform in brightness, color, color temperature, and CRI.

10. The luminaire according to claim 1 further comprising a gasket positioned between the optic and the housing.

11. The luminaire according to claim 1 wherein the trim is configured to be carried by the housing so as to overlie the optic perimeter.

12. The luminaire according to claim 1 wherein the mounting member comprises a plate mounting member comprising a base member with a medially located aperture; wherein the plate mounting member is configured to be attached to the external structure; and wherein the plate mounting member is configured to be attached to the luminaire by the positioning of at least part of the luminaire within the medially located aperture.

13. The luminaire according to claim 12 wherein the base member comprises one or more attachment features configured to facilitate the attachment of the plate mounting member to the external structure.

14. The luminaire according to claim 12 wherein the base member comprises one or more projection members positioned adjacent to the medially located aperture so as to attach to a structure of the luminaire that extends through the medially located aperture.

15. The luminaire according to claim 14 wherein the housing comprises a distal cavity comprising one or more projections; and wherein the projection members comprise one or more bends configured to conform, interface, and interlock with the projections of the distal cavity.

16. The luminaire according to claim 1 wherein the mounting member comprises hook mounting members attachable to the luminaire housing and configured to engage the external structure.

17. A luminaire comprising:

a housing formed of heat resistant polycarbonate material;

an optic formed of heat resistant polycarbonate material and carried by the housing;

a trim carried by the optic;

a power circuit;

a light source comprising:

an LED board comprising a copper layer, a plurality of light-emitting diodes (LEDs) disposed on the LED board and electrically coupled to the power circuit, and control circuitry operably coupled to the plurality of LEDs, wherein the LED board is positioned in thermal communication with the housing; and a plate mounting member comprising a base member with a medially located aperture;

wherein the control circuitry is configured to operate the plurality of LEDs such that heat generated by the plurality of LEDs is dissipated by the copper layer of the LED board so as to maintain a thermal equilibrium in the plurality of LEDs;

wherein the control circuitry is configured to reduce the thermal energy produced by the plurality of LEDs by one of reducing the duty cycle and underdriving one or more of the LEDs;

wherein the plate mounting member is configured to be attached to an external structure being one of a canister light fixture and a junction box; and wherein the plate mounting member is configured to be attached to the luminaire by the positioning of at least part of the luminaire within the medially located aperture.

18. A kit comprising:

a luminaire comprising:

a housing formed of heat resistant polycarbonate material, an optic formed of heat resistant polycarbonate material and carried by the housing, a trim carried by the optic, and a light source comprising:

an LED board comprising a copper layer, a plurality of light-emitting diodes (LEDs) disposed on the LED board, and control circuitry operably coupled to the plurality of LEDs, wherein the LED board is positioned in thermal communication with the housing;

a mounting member comprising at least one of:

a plate mounting member comprising a base member with a medially located aperture, one or more spring mounting members, and one or more hook mounting members.

19. The kit according to claim 18 wherein the luminaire further comprises a power circuit; and wherein the plurality of LED are electrically coupled to the power circuit.

* * * * *